O. H. WATKINS.
DRIVING MECHANISM FOR WASHING MACHINES.
APPLICATION FILED APR. 1, 1912.
1,074,073.
Patented Sept. 23, 1913.
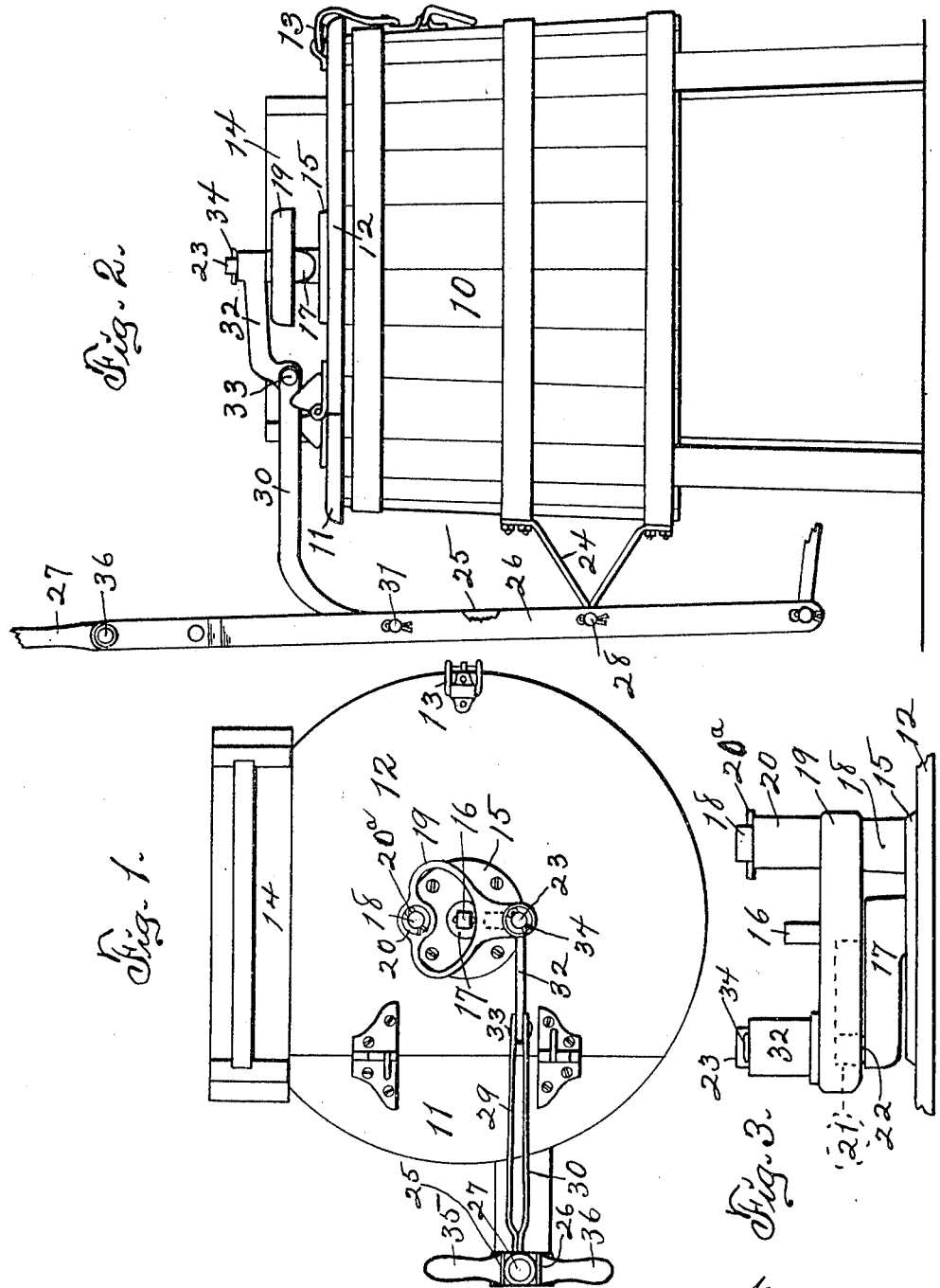

UNITED STATES PATENT OFFICE.

ORLA H. WATKINS, OF CLINTON, IOWA, ASSIGNOR TO HIMSELF, J. A. KELLY, AND W. J. KELLY, ALL OF CLINTON, IOWA.

DRIVING MECHANISM FOR WASHING-MACHINES.

1,074,073.

Specification of Letters Patent. Patented Sept. 23, 1913.

Application filed April 1, 1912. Serial No. 687,895.

*To all whom it may concern:*

Be it known that I, ORLA H. WATKINS, citizen of the United States of America, and resident of Clinton, Clinton county, Iowa, have invented a new and useful Driving Mechanism for Washing-Machines, of which the following is a specification.

This invention relates to improvements in driving mechanism for washing machines or the like, wherein motion is to be transmitted from an operating lever to a gear element working on an axis at an angle to the axis of the operating lever, as in the construction shown in my prior Patent No. 998,728, of July 25, 1911.

The principal object of the invention is to improve the power transmission connections between the operating lever and the gear element actuated thereby toward the end of securing a facile and easy normal operation of the parts by means of a construction of simple and inexpensive character, and, at the same time, of enabling the support which carries the gear element to be raised, carrying the gear element therewith and without the necessity of disconnecting any of the power transmitting parts.

An embodiment of the invention is illustrated in the accompanying drawings, in which:—

Figure 1 is a plan of my improved mechanism mounted as required for practical use. Fig. 2 is a side elevation of the same. Fig. 3 is an elevation of parts of the mechanism at right angles to Fig. 2.

In the construction of the device as shown the numeral 10 designates a support, in this instance the tub of a washing machine. The tub is provided with the usual cover composed of a stationary member 11 and a movable member 12 hinged thereto and provided with latching devices 13 adapted to hold the movable member in closed position on the tub. The tub also has a wringer stand 14 of common form. A plate 15 is mounted rigidly on the movable member 12 and is formed with a hole (not shown) registering with a hole (not shown) in the movable member, and a shaft 16, preferably square in cross-section, is mounted loosely through said holes and is free to rotate and to be moved longitudinally therein. A crank arm 17 is formed with a square hole loosely receiving yet fitted to the shaft 16, which hole is in one end portion of said arm. The arm 17 lies on the plate 15 at one end and is movable across said plate on an arc having an axis coincident with that of the shaft 16. A shouldered stud 18 is formed on and rises from the plate 15 parallel with and spaced from the shaft 16 and the shoulder of said stud is slightly higher than the arm 17. A skeleton lever 19 is fulcrumed at one end on the stud 18 and rests on the shoulder of said stud. The lever 19 is formed with a hub 20 rising therefrom and providing a relatively long bearing on the stud 18 and a key 20$^a$ retains the lever on the stud. The lever 19 loosely embraces the shaft 16 and extends over the crank arm 17, and is movable through an arc of approximately a half circle without contact with the shaft. The lever 19 is formed with a groove 21 (dotted lines Figs. 1 and 3) in its lower face and a pin 22 is formed on and rises from the outer end of the arm 17 and enters said groove. A stud 23 is formed on and rises from the outer end of the lever 19. A bracket 24 is fixed to and extends outward from the lower portion of the side of the support 10 and a lever is fulcrumed on said bracket. The lever is composed of counterpart metal bars 25, 26 and a wooden handle 27 received between and fixed to the upper ends of said bars. The bars 25, 26 are arranged on opposite sides of the bracket 24 and a fulcrum bolt 28 extends through them. The lever bars 25, 26 may extend below the tub and be connected to devices (not shown) under the tub; but my present invention is not concerned with any devices below the fulcrum. A jointed pitman connects the hand lever and skeleton lever. The jointed pitman is composed of counterpart bars 29, 30 curved downwardly at their outer ends and conjunctively pivoted on a bolt 31 carried by the lever bars 25, 26 above the fulcrum 28; and a member 32 curved downwardly at its outer end and received between the inner ends of the bars 29, 30 and pivoted to said bars by a rivet 33, said member 32 being pivoted at its inner end on the stud 23 and held thereon by a key 34. The axes of articulation of the bars 29, 30 on the hand lever and of the joint rivet 33 are parallel, while the axis of articulation of the member 32 on the stud 23 is at right angles to the other axes. Thus provision is made for moving the member 12 and devices thereon through an arc, as required to open the tub, without disturbing the hand lever. There is some lateral flexibility in the jointed pitman and between said pitman and the hand lever, which permits the inner end of the pitman to move through an arc. In the manual oscillation of the hand lever the jointed pitman oscillates the skeleton lever 19 and it, in turn, oscillates the crank arm 17 and the shaft 16 engaged thereby. Lateral handles 35, 36 are fixed to the upper ends of the lever bars 25, 26 and may be used together with or separate from the handle 27 as desired, to oscillate the hand lever.

I claim as my invention—

1. Driving mechanism for washing machines, comprising a suitable support, a lever fulcrumed on said support, a shaft mounted for rotation and rectilinear reciprocation in said support, a crank arm feathered to said shaft, a lever variably acting on said crank arm, a pitman composed of pivotally connected members, one member bent downwardly at its outer end and pivoted to the first lever on a horizontal axis, the other member pivoted to the second lever on a vertical axis, the pivot between the members being horizontal.

2. Driving mechanism for washing machines, comprising a suitable support, a movable member hinged to said support, a lever fulcrumed on said support, a shaft mounted for rectilinear reciprocation and rotation in said movable member, a crank arm feathered to said shaft, a second lever fulcrumed on the movable member and variably acting on said crank arm and a jointed pitman pivotally connecting said levers, the joint in the pitman being arranged for articulation on an axis parallel with the pitman connection to the first lever and with the hinge connection of the movable member.

3. In a driving mechanism for washing machines, an operating lever, arranged for oscillation on a horizontal axis and mounted on a stationary support, a second lever arranged for oscillation on a vertical axis, a pitman jointed between its ends for articulation on a horizontal axis, one end of said pitman being pivoted horizontally to the operating lever, the opposite end of said pitman being pivoted vertically on the second lever, and a support hinged on a horizontal axis and carrying the second lever aforesaid.

4. In a driving mechanism for washing machines, an operating lever pivoted on a horizontal axis and mounted on a stationary support, a movable support, a shaft journaled in the movable support, an oscillatory gear element for operating said shaft, and pitman connections between said lever and said shaft and so jointed as to permit of the movable support and therewith the gear element being raised without disconnection of said pitman connections.

5. In a driving mechanism for washing machines, an operating lever arranged for oscillation on a horizontal axis and mounted on a stationary support, a gear element arranged for oscillation on a vertical axis, a pitman comprising elements pivotally jointed at their adjacent ends on a horizontal axis, one end of said pitman being pivoted horizontally to the operating lever, the opposite end of the pitman being pivoted vertically on the gear element, and a movable support hinged on a horizontal axis and carrying the gear element.

Signed by me at Clinton, Iowa, this 29th day of November, 1911.

ORLA H. WATKINS.

Witnesses:
WM. J. BURKE,
H. A. KELLY.

Copies of this patent may be obtained for five cents each, by addressing the "Commissioner of Patents, Washington, D. C."